April 5, 1927.    A. N. VAN NOSTRAND    1,623,220
TELAUTOGRAPH SYSTEM
Filed April 14, 1926    6 Sheets-Sheet 1

INVENTOR
Arleigh N. Van Nostrand
BY HIS
ATTORNEYS

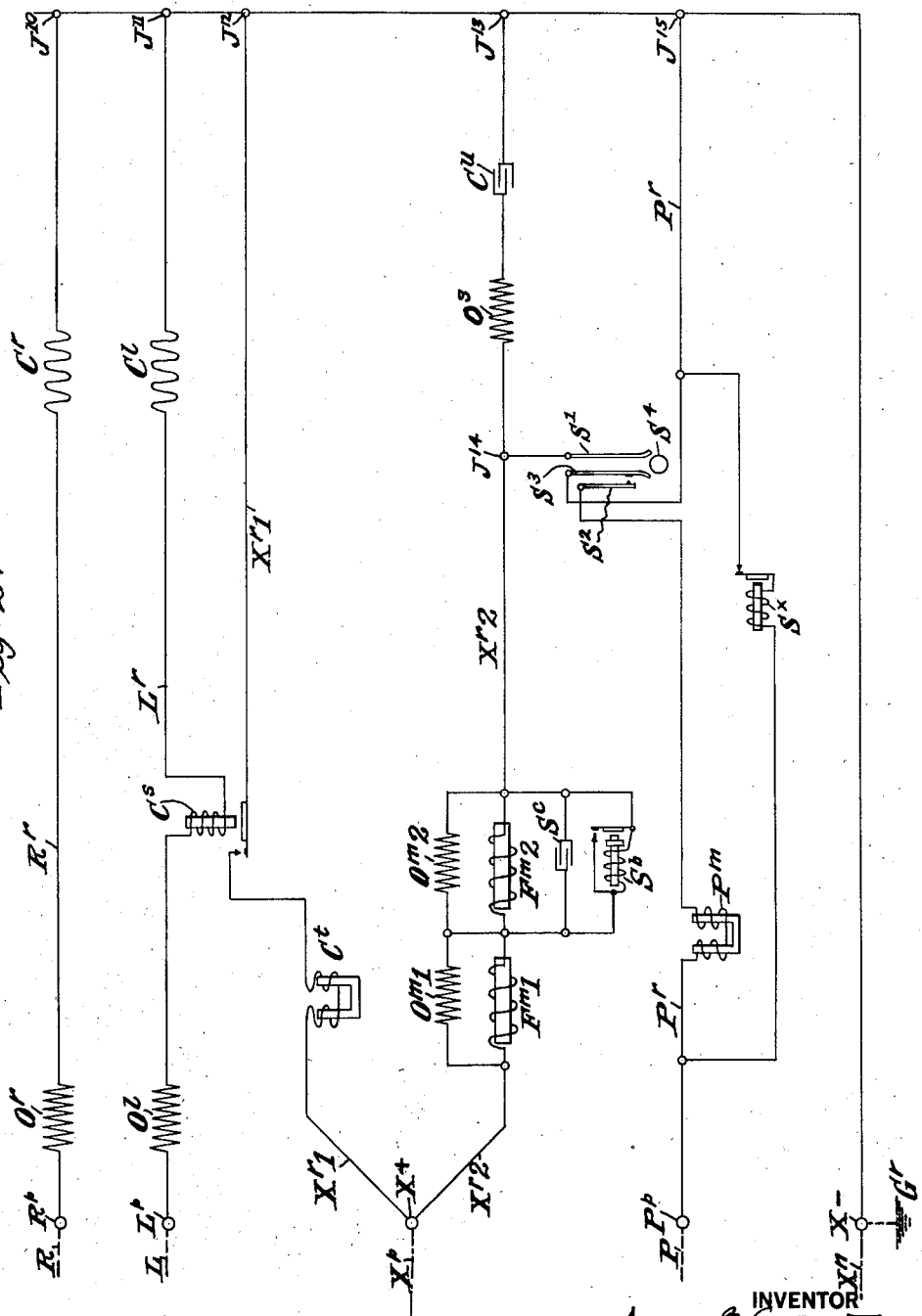

April 5, 1927. 1,623,220
A. N. VAN NOSTRAND
TELAUTOGRAPH SYSTEM
Filed April 14, 1926    6 Sheets-Sheet 3
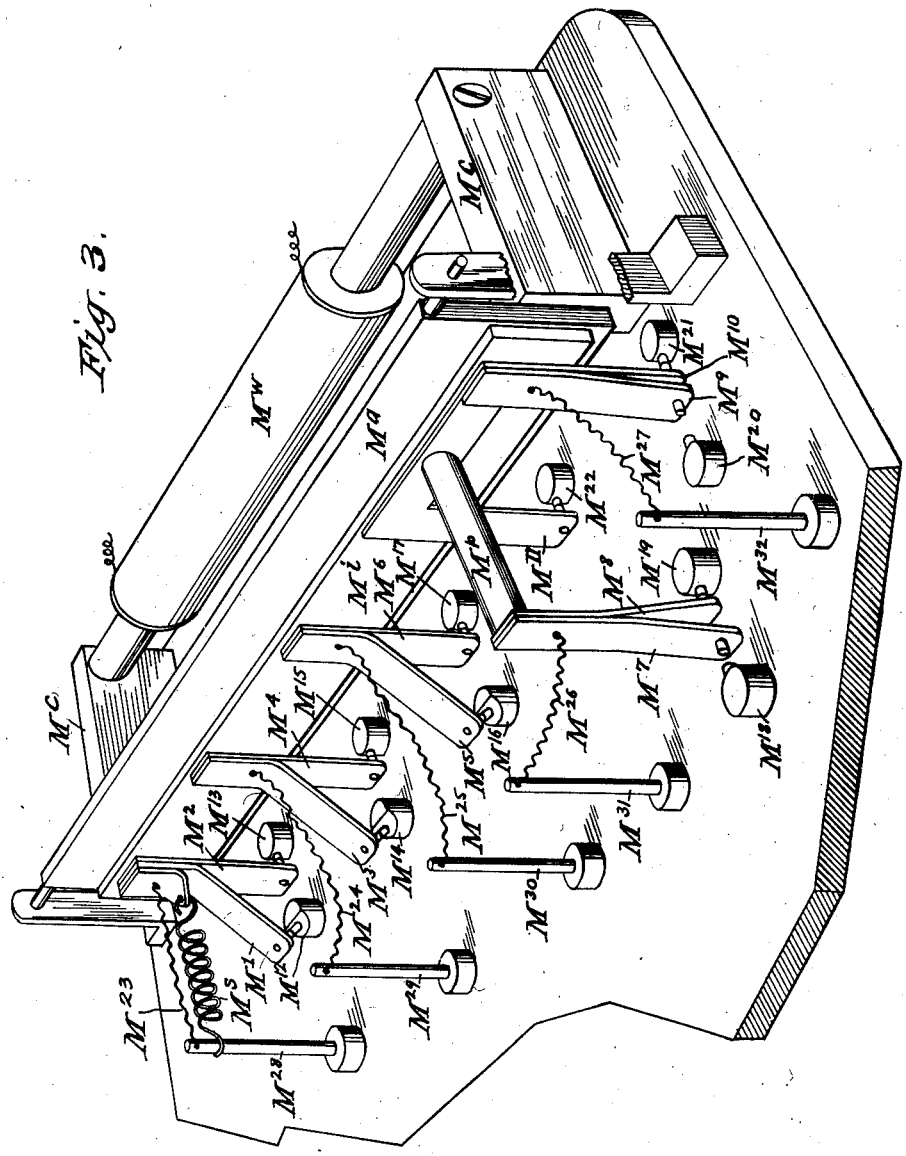
INVENTOR
Arleigh N. Van Nostrand
BY HIS
ATTORNEYS April 5, 1927.
A. N. VAN NOSTRAND
1,623,220
TELAUTOGRAPH SYSTEM
Filed April 14, 1926 6 Sheets-Sheet 4
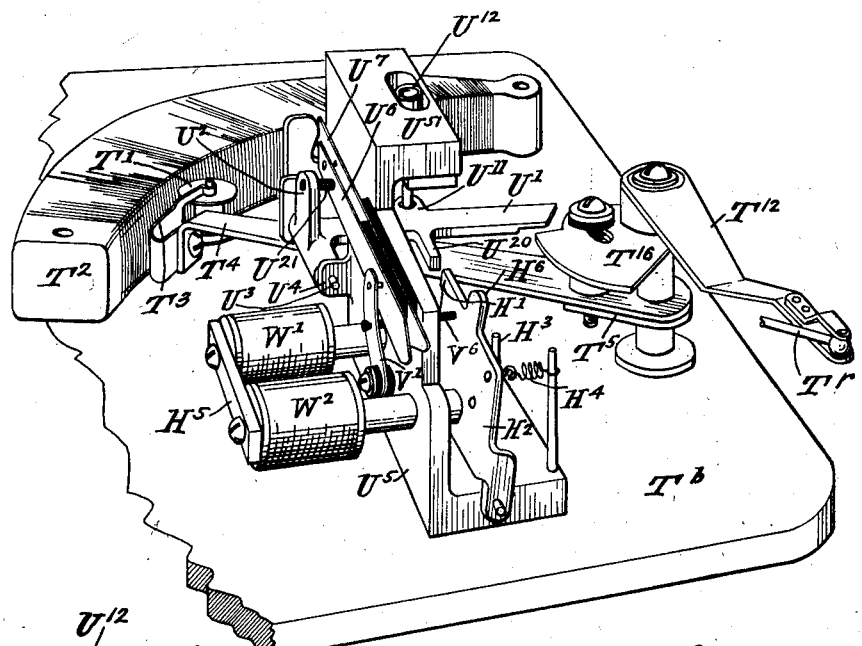
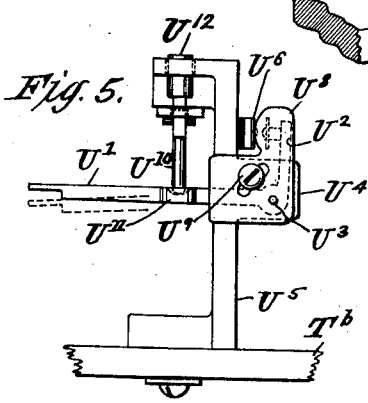
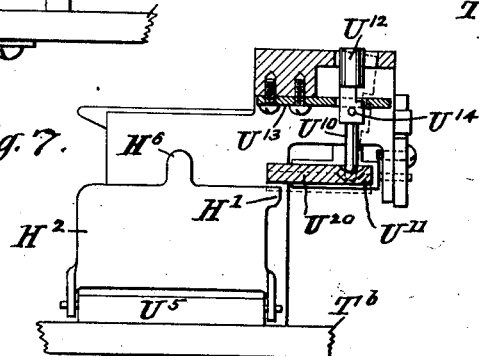
INVENTOR
Arleigh N. Van Nostrand
BY HIS
ATTORNEYS April 5, 1927.
A. N. VAN NOSTRAND
1,623,220
TELAUTOGRAPH SYSTEM
Filed April 14, 1926
6 Sheets-Sheet 5
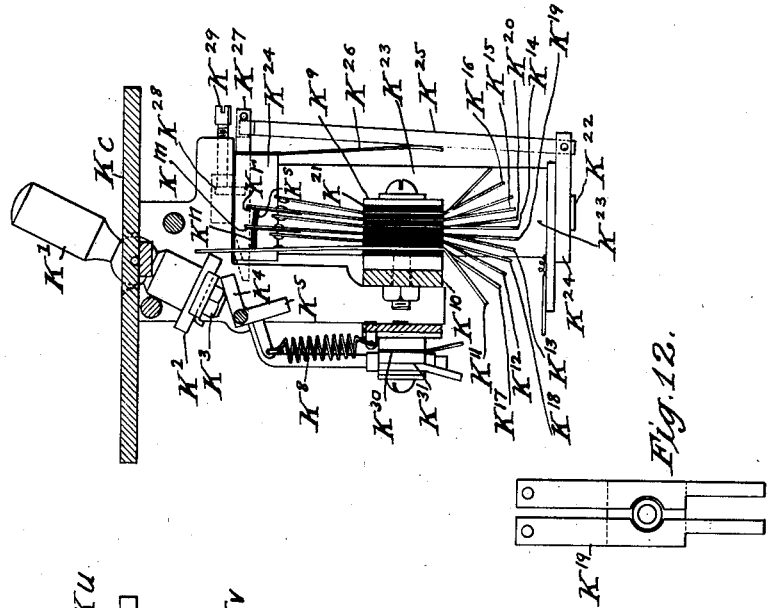
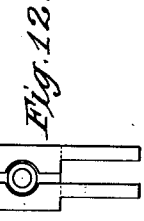
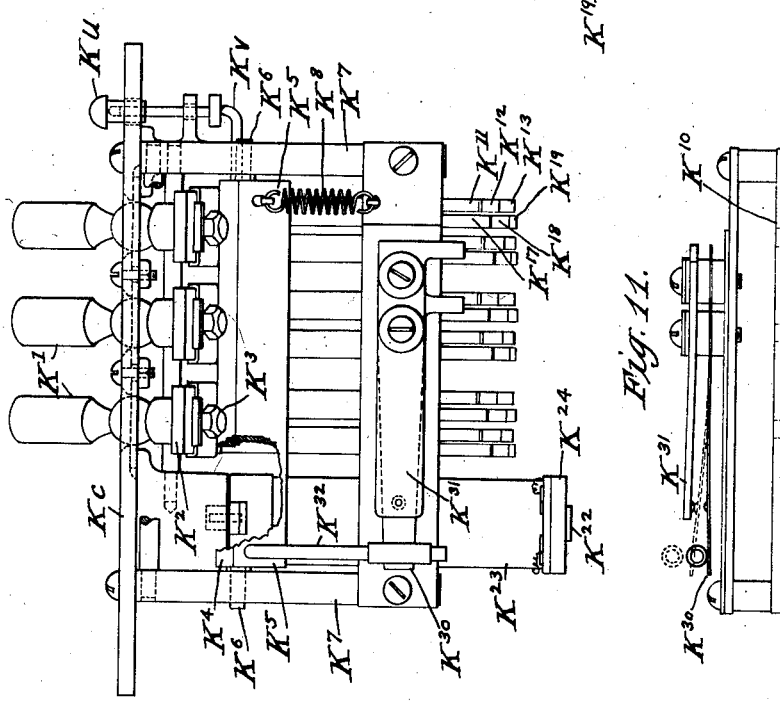
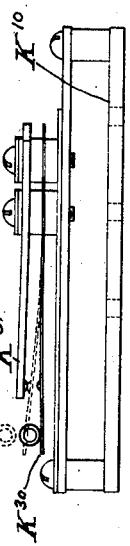
INVENTOR
Arleigh N. Van Nostrand
BY
ATTORNEYS

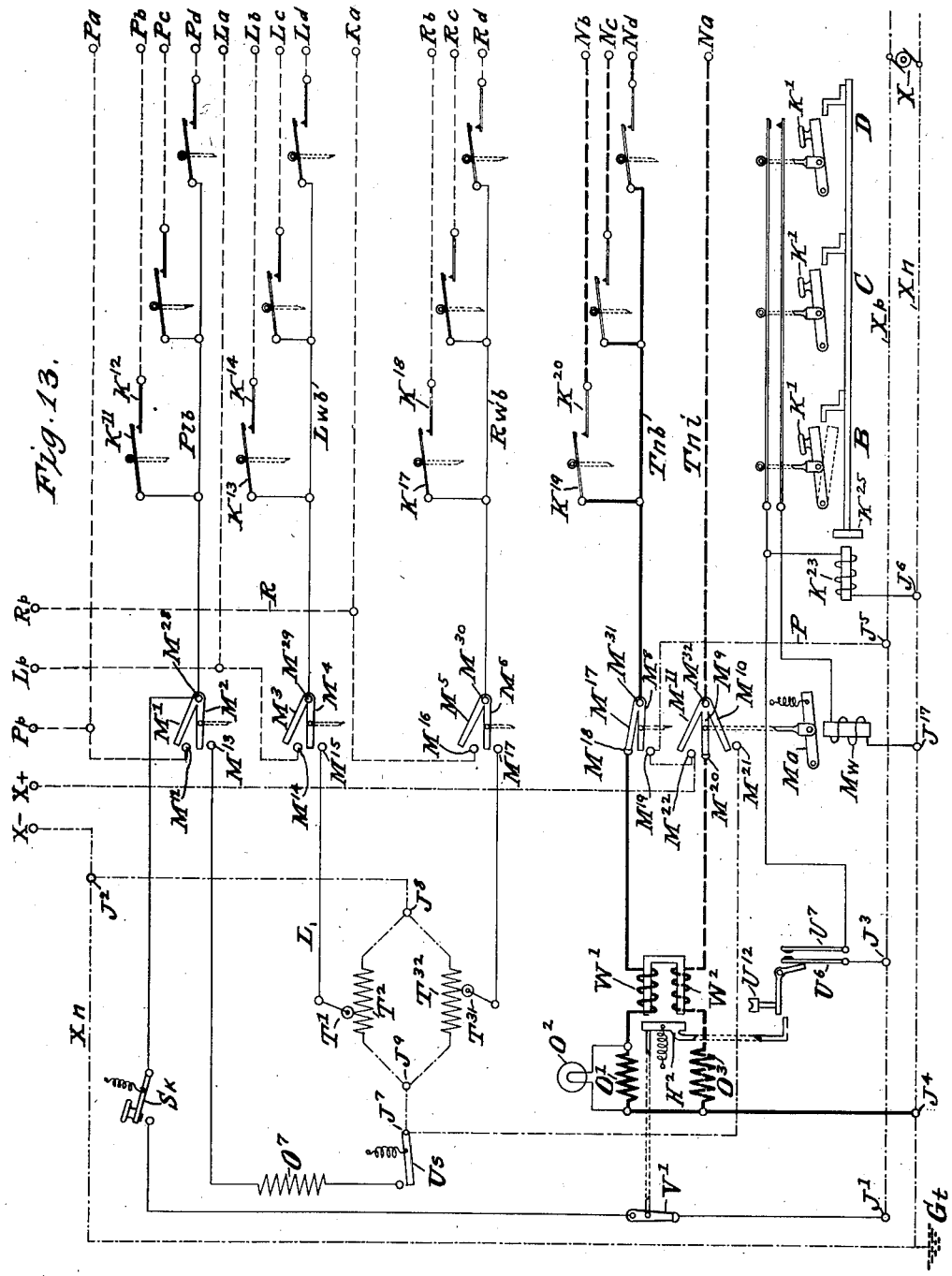

Patented Apr. 5, 1927.

1,623,220

UNITED STATES PATENT OFFICE.

ARLEIGH N. VAN NOSTRAND, OF FLUSHING, NEW YORK, ASSIGNOR TO TELAUTOGRAPH CORPORATION, OF NEW YORK, N. Y., A CORPORATION OF VIRGINIA.

TELAUTOGRAPH SYSTEM.

Application filed April 14, 1926. Serial No. 101,905.

This invention relates to improvements in telautograph systems, being especially suitable for systems in which there are more than two stations, each of which is to be capable of receiving from and transmitting to any one of the others. Where more than three stations are provided, the system is such as to permit the transmission of a message between one pair of stations at the same time that another message is being transmitted between another pair of stations.

The general object of the invention is to provide a multi-station telautograph system of the variable current type, whereby the operator at any idle station may quickly connect his station with any other idle station, and, after making such connection, may transmit his message without possibility of being interrupted by either the receiving station or any other station, these results being attained by the apparatus without the employment of delicately adjusted instruments requiring frequent inspection and adjustment.

In order to avoid the use of delicate mechanism, the present system employs four line wires running from each station to all the other stations. For simplicity of explanation, these four line wires will hereafter be designated as a "group." In practice there are as many of such groups as there are stations capable of both transmitting and receiving.

The invention will be fully described hereinafter in connection with the accompanying drawings and then particularly pointed out in the claims.

In the drawings,—

Figure 2 is a similar view of a receiver;

Figure 3 is a conventional perspective view intended to illustrate the master switch;

Figure 4 is a similar view illustrating the unison switch and locking mechanism therefor;

Figure 1:
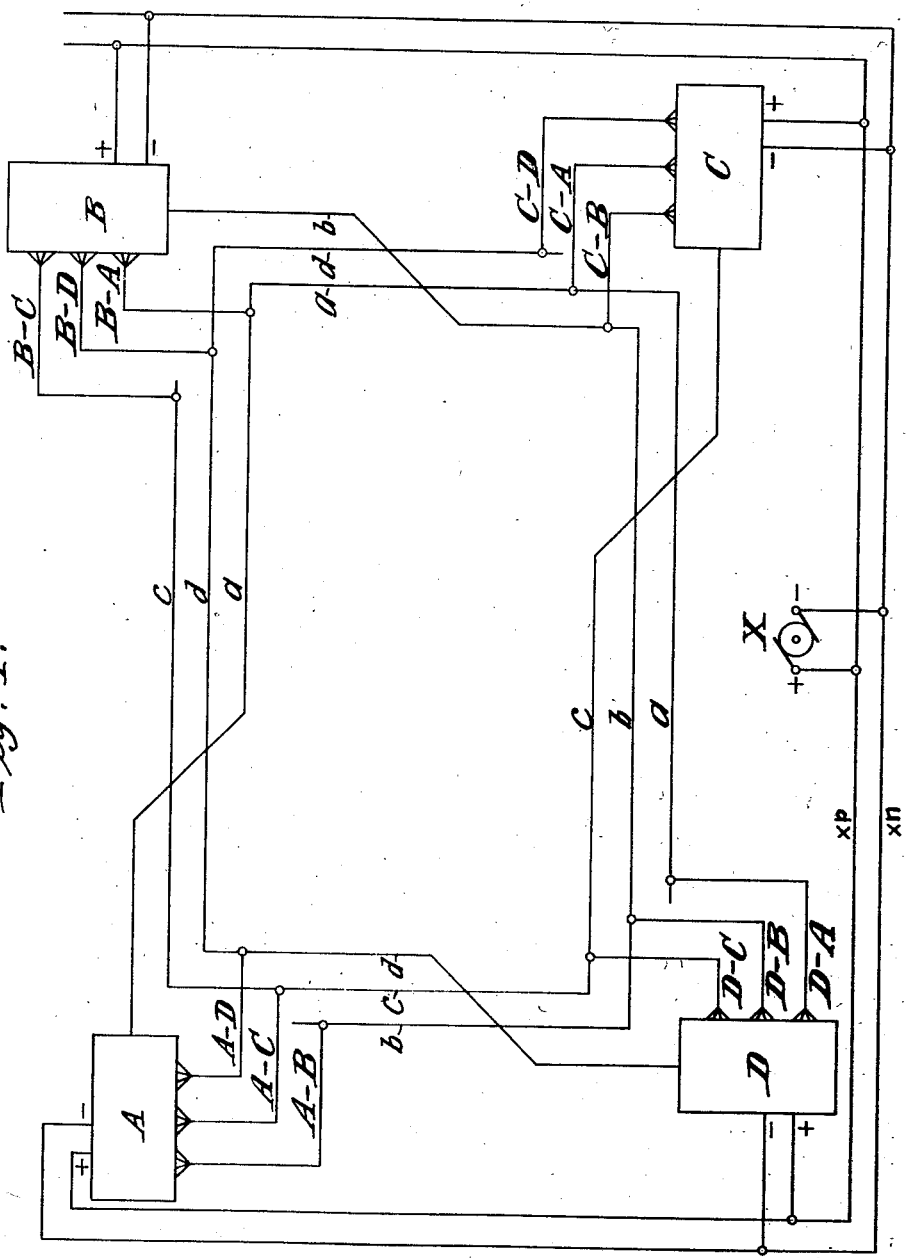
Figure 1 is a diagrammatic view illustrating the group connections of a four station system, each group of four line wires being indicated by one wire, as if the line wires of a group were in a cable.

Figures 5 to 8 inclusive are detail views of the mechanisms shown in Figure 4;

Figures 9 to 12 inclusive are views illustrating the key switch mechanism with its locking device and the means for closing the master switch circuit;

Figure 13 is a diagrammatic view illustrating the circuit system of the transmitter.

The description hereinafter of a system embodying the preferred form of invention is subdivided as follows:

(1) The line wire system connecting the stations.
(2) The power supply.
(3) The receiver.
(4) The master-switch.
(5) The unison-switch and transmitter locks.
(6) The key-switches.
(7) The key-lock.
(8) The key-operated closure for the master-switch circuit.
(9) The transmitter wiring and the circuits of the system generally.

(1) *The line wire system.*—Referring to Figure 1, the four stations are indicated by four rectangles, these stations being designated by capital letters, A, B, C, and D. That group of four line wires which may be considered as directly connected to a station and which is to be used for calling and writing to said station is marked with the same letter of the alphabet as the station, but with a lower case letter. That is, the group which enables stations B, C, and D, respectively, to communicate with station A is marked $a$. The corresponding group for B is marked $b$, that for C is marked $c$ and that for D is marked $d$.

At each station there is shown a group tap from each group except its own, each of these taps containing, of course, the four line taps, and leading to a key switch at such station. For example, station B has three key switches, more fully described hereinafter, and from these key switches three group taps lead to the groups $a$, $c$, and $d$ respectively. These group taps are designated by a combination of two reference letters, the first indicating the sending station and the second the receiving station. For example, the group tap which station B may use to transmit a message to station A is marked B—A, the group tap by which station B may transmit a message to station C is marked B—C and so on. Thus at station A are group taps A—B, A—C, A—D; at station B, group taps B—A, B—C, B—D; at station C, group taps C—A, C—B, C—D; and at station D, group taps D—A, D—B, D—C.

Each station, of course, has a transmitter and a receiver. When any station is transmitting to another station, the transmitter actuates the receiver at said other station and also its own receiver, which latter receiver, in this condition of operation, is referred to as a pilot receiver, since it guides the transmitting operator in his writing because he can read on his own receiver an exact copy of the message written by him at the distant receiver. Hence the receiver at any station may be termed either a pilot receiver or a distant receiver, according to whether it is being operated by the transmitter of its own station or by that of a distant station.

The four wires in a group may be designated as the P, L, R and N wires, respectively, the first being the pen-lifting and signal wire, the second the left-hand writing current wire, the third the right-hand writing current wire, and the fourth the wire which carries current to one of the locking magnets which lock the transmitter of the receiving station.

The four wires may be referred to generally by said letters P, L, R and N, and specifically by the same letters accompanied by the small letter of the cable. For example, wires $Pa$, $La$, $Ra$, and $Na$ are the four wires of group $a$, $Pb$, $Lb$, $Rb$ and $Nb$, the four wires of group $b$, and so on. Of the four wires, the P, L and R wires extend directly to the receiver of the corresponding station whereas the N wires do not extend beyond the transmitter of the same station. That is to say, $Pa$, $La$, $Ra$ are in standing connection with the receiver at station A while the wire $Na$ does not go to the receiver of station A but only to the transmitter thereof and the circuit over this wire includes certain contacts and contact springs at the master switch of station A, as more fully explained hereinafter.

In addition to the groups $a$, $b$, $c$ and $d$, Figure 1 shows two power lines leading from a central source of direct current, for example, a dynamo X, to all the stations. The positive power line is marked $Xp$ and the negative power line $Xn$.

(2) *The power supply.*—The telautograph apparatus may be supplied with power from any direct current source. There may be two power lines extending to all stations and supplied with direct current from a common source. One of the said two power lines from the common source may be replaced by a ground return, as is well understood in the art. Or where there are objections to a common power source and a line or lines therefrom to all stations, there may be provided a local source of power for each station, in which case each local source has its negative connected to ground.

To simplify the illustration and explanation it will be assumed that all stations are supplied with power from a common source of direct current, as shown in Figures 1 and 2.

(3) *The receiver.*—The receiver diagram, Figure 2, shows the R writing line marked $Rr$ extending from the receiver terminal post $Rp$ to the junction $J^{10}$ with the negative power line. In the $Rr$ writing line is inserted a resistance $Or$ and the right bucket coil $Cr$; that is, one of the movable coils operating in the magnetic field of a field magnet and controlling the writing pen. At $Lp$ is indicated the receiver terminal post, from which the $Lr$ writing line extends to its junction with the negative power line at $J^{11}$. In this line is inserted a resistance $Ol$, the coil $Cs$ of a writing line relay and the left bucket coil $Cl$, which cooperates with the right bucket coil $Cr$ to control the pen.

The relay coil $Cs$, when energized, attracts its armature and closes one branch, $Xr^1$ of a local power circuit leading from the receiver terminal, marked $X+$, (which is connected to the positive power line) to the junction ($J^{12}$) with the negative power line. In this branch $Xr^1$ is inserted the winding $Ct$ of a paper shifter magnet and the contact device operated by the armature of the said relay.

From the said terminal post marked $X+$ another branch line $Xr^2$ extends to a junction $J^{14}$ and thence to a contact spring $S^1$ arranged to be closed onto the negative power line, as more fully described hereinafter. In this branch $Xr^2$ are included the two windings $Fm^1$, $Fm^2$, of the field magnet in whose electro-magnetic field the R and L bucket coils ($Cr$, $Cl$) move. Suitable high resistance shunts are provided around each field coil as shown at $Om^1$ and $Om^2$ to take care of the discharge currents from said field, when the branch circuit in which they are inserted is opened. Also, for the purpose of overcoming friction of the writing pen against the paper, the pen is given a continuous exceedingly slight vibration, by vibrating the field in which the bucket coils work. This is done by a so-called shaker buzzer $Sb$ located in a shunt circuit around one of the field windings, this circuit being bridged by a condenser $Sc$ to take the oscillating discharge from the windings of the field magnet, $Fm^2$, when one of the field magnet windings is intermittently shunted by the buzzer.

At $Pp$ is indicated the receiver terminal from which extends the $Pr$ line of the receiver leading to a junction with the negative power line, indicated at $J^{15}$. This $Pr$ line includes the windings of the pen-lifter magnet $Pm$ and is opened and closed by a pair of contact springs $S^2$ and $S^3$. These two contact springs are arranged to be moved into contact with each other by a metallic pin or stud $S^4$ operated by the armature of the paper shifter magnet. This stud also contacts with the springs $S^1$ and $S^3$ and thereby closes the field magnet coils onto $S^3$ and thus connects them to the negative power line at $J^{15}$. This path is opened at said springs when the paper shifter magnet is de-energized.

To take care of the oscillatory discharge when the springs $S^1$ and $S^3$ break contact with stud $S^4$, a branch is provided from junction $J^{14}$ to the negative power line at $J^{13}$, this branch including a resistance $Os$ and a stopping condenser $Cu$.

A shunt from the $Pr$ line is provided around the pen lifter windings and the contact springs $S^2$ and $S^3$, in which shunt is inserted a high resistance signal buzzer $Sx$ arranged to be actuated on closing the signal key at the transmitter, hereinafter referred to. As will be more fully explained hereinafter, this signal key closes the P line onto the positive power line at the transmitter. The signal current thrown onto the P line by closing the signal key is strong enough to work the signal buzzer at the receiver, whereas the normal current, although strong enough to work the pen-lifter, is not strong enough to work the signal buzzer.

In Figure 2, the receiver post to which the negative power line is connected is indicated at X—.

Where only one power wire is used between stations the receiver may have its negative side grounded, as indicated in dotted lines at $Gr$.

The receiver illustrated diagrammatically in Figure 2 is of the type disclosed more fully in my application Serial No. 32,905, filed May 26, 1925.

(4) *The master switch.*—This is an electro-magnetic switch having a coil which when energized pulls up its armature against the action of a spring. The armature carries a plurality of contact devices which are insulated from it.

In the embodiment of the invention shown conventionally in Figure 3 of the drawings, the armature carries five contact devices. Four of these are double contact devices and the fifth is a triple contact device. Three of the four double contact devices make contact simultaneously with two contact posts, while the fourth makes contact alternately with first one contact post and then with the other. The triple contact device makes contact simultaneously with two contact posts and alternately with these and with a single contact post.

In the specific embodiment illustrated, the four double contact devices each consist of a pair of resilient contact springs, indicated at $M^1$, $M^2$; $M^3$, $M^4$; $M^5$, $M^6$; and $M^7$, $M^8$; respectively, Figure 3. The springs of each pair are conductively connected at their upper ends. The fifth contact device comprises an inverted U-shaped plate with two resilient legs $M^{10}$, $M^{11}$, to which plate is attached the third contact leg $M^9$, all of these legs being conductively connected. The pairs of contact springs indicated at $M^1$ to $M^6$ and the contact springs $M^9$ to $M^{11}$ inclusive are carried directly by a bar of insulating material $Mi$ secured to the armature $Ma$ while the pair of contact springs indicated at $M^7$, $M^8$ are carried at the outer end of a post $Mp$ of insulating material which extends at right angles from and is carried by the armature.

The springs $M^1$ to $M^6$, respectively, are arranged to make contact simultaneously with the respective contact posts $M^{12}$, $M^{13}$, $M^{14}$, $M^{15}$, $M^{16}$, $M^{17}$, when the armature $Ma$ is attracted, and to break said contact when said armature is moved in the opposite direction by its spring $Ms$.

Referring to the contact springs $M^7$, $M^8$, the former is arranged to contact with a contact post $M^{18}$ when the armature is not attracted and the spring $M^8$ contacts with post $M^{19}$ when the armature is attracted. The contact spring $M^9$ is arranged to contact with a contact post $M^{20}$, when the armature is not attracted, while the springs $M^{10}$ and $M^{11}$ contact with the respective contact posts $M^{21}$ and $M^{22}$ when the armature is attracted.

Each of the contact devices is electrically connected by a flexible conductor or pig-tail (these being indicated at $M^{23}$, $M^{24}$, $M^{25}$, $M^{26}$ and $M^{27}$, respectively) to a terminal post, these being indicated at $M^{28}$, $M^{29}$, $M^{30}$, $M^{31}$ and $M^{32}$, respectively.

The master switch has a winding or coil $Mw$ and a soft iron core with ends which extend laterally toward the armature $Ma$, the said ends being marked $Mc$.

From the description thus far given it will be seen that when the winding $Mw$ of the master switch is not energized, the armature $Ma$ is held away from the core-ends $Mc$ by the spring $Ms$. In this condition of the master switch (which may be referred to as the receiving position), there is an electrical path from terminal post $M^{31}$ through pig-tail $M^{26}$ and contact spring $M^7$ to contact post $M^{18}$. Also there is an electrical path from terminal post $M^{32}$ through pig-tail $M^{27}$ and contact spring $M^9$ to contact post $M^{20}$. At this time all the other contact springs are not in contact with their respective contact posts.

When the winding $Mw$ is energized and the armature $Ma$ is attracted (which condition may be referred to as the transmitting position) the electrical paths hereinbefore described are broken, the contact springs $M^7$ and $M^9$ being separated from their respective contact posts $M^{18}$ and $M^{20}$, and the following electrical paths are established:

From contact post $M^{13}$ through contact spring $M^2$ and pig-tail $M^{23}$ to terminal post $M^{28}$ and also through contact spring $M^1$ to contact post $M^{12}$.

From contact post $M^{15}$ through contact spring $M^4$ and pig-tail $M^{24}$ to terminal post $M^{29}$, and also through contact spring $M^3$ to contact post $M^{14}$.

From contact post $M^{17}$ through contact spring $M^6$ and pig-tail $M^{25}$ to terminal post $M^{30}$, and also through contact spring $M^5$ to contact post $M^{16}$.

From contact post $M^{19}$ through contact spring $M^8$ and pig-tail $M^{26}$ to terminal post $M^{31}$.

From contact post $M^{22}$, through contact spring $M^{11}$ and pig-tail $M^{27}$ to terminal post $M^{32}$ and also over contact spring $M^{10}$ to contact post $M^{21}$.

(5) *The unison switch and transmitter locks.*—As these are closely combined in one piece of mechanism they will be described together.

Referring particularly to Figures 4 to 8 of the drawings, $T^1$ represents the left hand contact roller of a transmitter, which roller is to be arranged to roll over and make contact with the left hand rheostat $T^2$ (Figure 4). This rheostat comprises a winding of resistance wire on a porcelain frame. The roller $T^1$ is journaled in a spring arm $T^3$, secured to the downward bent end of an arm $T^4$ supported by a bracket arm $T^5$ fixed to a barrel or tubular support $T^6$ rotatable on a post $T^7$ secured to the transmitter base $Tb$, this base being of good insulating material. The barrel $T^6$ is held against accidental withdrawal from the post $T^7$ by a washer $T^8$ at the top of the post, this being held in place by a screw $T^9$ threaded into the upper end of the post. At the upper end of the barrel $T^6$ is movably mounted a collar $T^{10}$ which is insulated from the barrel by a bushing $T^{11}$ of insulating material. To the upper face of this collar is fixed an arm $T^{12}$ arranged to connect with one of the rods $Tr$ to which the transmitter stylus is connected. To the lower face of the collar $T^{10}$ is fixed a plate-arm $T^{13}$, which has an arc-shaped slot. Between this plate-arm and the arm $T^4$ is located a spacing device comprising a block $T^{14}$ carrying a washer $T^{15}$ of insulating material which has a reduced end arranged to project upward into the arc-shaped slot in the plate of the plate-arm $T^{13}$. On top of the plate-arm is placed a locking-plate $T^{16}$ having a forked end arranged to engage the collar $T^{10}$ and also having an arc-shaped slot arranged to register with that of the plate-arm $T^{13}$. Through the two arc-shaped slots and through the washer $T^{15}$ and block $T^{14}$ passes a screw $T^{17}$ which is threaded into a hole in the arm $T^5$, the screw $T^{17}$ being provided just under its head with a metal washer $T^{18}$, and below this with an insulating washer $T^{19}$.

It will be seen from the description thus far given that current passing from the rheostat $T^2$ to the contact roller $T^1$, may pass through the spring-arm $T^3$, the arm $T^4$ and bracket arm $T^5$ to the barrel $T^6$ and thence to the post $T^7$. The latter is provided at its lower end, below the transmitter base with a terminal post $T^{20}$ which is provided with washers $T^{21}$ and is threaded to receive a binding nut $T^{22}$ which may clamp the looped end of a wire leading the current to the left hand writing current wire of the system.

The collar $T^{10}$, the arm $T^{12}$, the plate-arm $T^{13}$ and the locking-plate $T^{16}$ are insulated from the arm $T^4$ and barrel $T^6$ by the insulating devices heretofore described, viz: the bushing $T^{11}$, between the barrel $T^6$ and the collar $T^{10}$, the washer $T^{15}$ between the block $T^{14}$ and plate arm $T^{13}$, and the washer $T^{19}$ between the screw $T^{17}$ and the locking-plate $T^{16}$.

On account of the arc-shaped slot in plate-arm $T^{13}$ and the connection of the latter to the collar $T^{10}$ to which the arm $T^{12}$ is fixed, the angular relation of the arms $T^4$ and $T^{12}$ may be adjusted within limits, by loosening the screw $T^{17}$ and rotating the collar $T^{10}$ to the desired extent, whereupon the screw $T^{17}$ may be tightened. Also at the same time, the position of the locking-plate $T^{16}$ may be adjusted because of its arc-shaped slot for a purpose hereinafter described.

This locking-plate is arranged to coact with the locking arm $U^1$ of a bell crank fulcrumed on a pintle $U^3$ (Figure 5) supported by lugs $U^4$ carried by a support $U^5$ secured to the transmitter base $Tb$, the other arm $U^2$ of the bell crank being arranged to close contact springs $U^6$ and $U^7$ mounted on but insulated from the support $U^5$. The bell crank arm $U^2$ is provided with a plug of insulating material $U^{21}$ which, when the bell crank is moved in the proper direction serves to press the spring $U^6$ against the spring $U^7$ and to move the latter from its resting position where it rests against an adjustable stop-plate $U^8$ of insulating material, secured to the support $U^5$ in any suitable way, as for example, by a screw $U^9$ threaded into one of the lugs $U^4$ of the support. By loosening this screw $U^9$, the stop-plate $U^8$ can be moved angularly about the screw to determine the resting position of the spring contact $U^7$, the latter having an end projecting far enough beyond the end of spring $U^6$ to engage the edge of the upward projecting portion of the stop-plate $U^8$. Each spring-contact $U^6$ and $U^7$ is provided with suitable contact points which engage each other.

The contact springs U⁶ and U⁷ serve not only to close an electric circuit for the master switch magnet winding and key lock magnet winding, as more fully explained hereinafter, but also serve as mere springs to urge the bell-crank in one direction, viz: so that its arm U¹ will have its outer end above the level of the locking-plate T¹⁶. Suitable operating means is provided for swinging the arm U¹ against the action of springs U⁶ and U⁷ to a position where its outer end will be below the level of the locking-plate T¹⁶, when the latter is swung out of the way. This operating means in the present embodiment of the invention comprises a push-rod U¹⁰ whose lower end rests loosely in a socket formed in the upper face of a lug U¹¹, extending laterally from the bell-crank arm U¹, and whose upper end has an enlarged head U¹² advantageously cupped on its upper surface to receive the end of the transmitter stylus, which serves as a tool in the hands of the operator to push down the push-rod U¹⁰. The enlarged head is arranged to move vertically as well as laterally to a limited extent in an elongated slot in an overhanging lug U⁵¹ forming part of the support U⁵. This lug U⁵¹ is thicker towards the rear, as shown in Figure 7, and to the under side of this thicker portion is screwed a keeper plate U¹³ which has a rectangular slot through which plays a substantially rectangular portion of the push-rod U¹⁰, this portion in the present example being just below the enlarged head U¹² and extending somewhat below the keeper plate U¹³. Its lower end is provided with means for limiting the upward movement of the rod. In the present example this means consists of a pin U¹⁴ passing transversely through the rectangular portion of the push-rod and located so as to strike the lower face of the keeper-plate U¹³.

A notch is formed in the rectangular portion of the push-rod just below the enlarged head U¹², as shown in Figure 7, this notch being of such a size that the push-rod may swing laterally so that the edge of the keeper-plate adjacent the slot will be received in said notch, thereby preventing any upward movement of the push rod U¹⁰, whereby the arm U¹ of the bell-crank is locked in its extreme downward position, as shown by the dotted lines in Figs. 5 and 7. To free the arm U¹ so that it may move upward under the action of the contact-springs U⁶ and U⁷, the push-rod U¹⁰ must be swung backward laterally to carry its notched portion out of engagement with the edge of the keeper-plate U¹³, whereupon the push-rod U¹⁰ is free to move upward, thereby allowing the arm U¹ of the bell-crank also to move upward.

The push-rod U¹⁰ is intended to be operated only by the use of the point of the transmitter stylus in the hands of the operator. Hence, when the push-rod is thus being operated, the stylus and the contact rollers on the respective rheostats are in what has heretofore been known as the unison position. In this position, the contact rollers contact with the negative ends of their rheostats, that is, are at points of minimum potential. At starting, the transmitting operator places the end of his stylus in the cupped upper end of the push-rod and presses the latter down, whereby he will force down the arm U¹ of the bell-crank and cause the other arm U² of said bell-crank to bring the springs U⁶ and U⁷ into contact, thus closing the circuit for the master switch. Then, by swinging the upper end of the push rod U¹⁰ laterally toward him, by the use of the stylus point, he will lock the push-rod in its depressed condition, so that the circuit through the springs U⁶ and U⁷ will remain closed. This closing of the master switch, switch circuit and thereby of the writing circuits, takes place, therefore, only when the contact rollers are in positions of minimum potential at the rheostats. When the current is cut off, by means of the master switch, from the writing circuits, by releasing the push-rod U¹⁰ and allowing it to move upward, it follows that the said writing circuits can only be established or broken when the position of the transmitter stylus is such as to give only a minimum value of current, at which time the movable coils or so-called bucket coils are in or close to their out-of-action position and their springs have little tension. Hence, when the writing circuits are made or broken with the receiver bucket coils in said position, the latter will not be moved violently and therefore all danger of sudden jars of the receiving apparatus will be avoided, as will be understood by those skilled in the art.

The purpose of the locking-plate T¹⁶ is to make certain that the operator will use the point of the transmitter stylus to operate the push-rod U¹⁰, or, at least, to compel him to bring the stylus to its unison position if he attempts to operate the push-rod with some implement other than the stylus point. The said locking plate T¹⁶ is either under the arm U¹ or over it, according as the said arm is down or up, except when the transmitter stylus is in the unison position, and hence the arm U¹ is locked against movement, except in said unison position. When, however, the arm T¹² has been swung by moving the transmitter stylus to the unison position, the locking plate T¹⁵ is brought to a position where it clears the end of the arm U¹ of the bell-crank, and then the said arm may be freely moved up or down.

In order to permit other stations to lock the arm U¹ in its upper position, so that said arm may not be manually depressed to close the writing circuit at the springs U⁶ and U⁷, a suitable electro-magnetic locking device and circuits therefor are provided. In the best embodiment of the invention, the arm U¹ is provided with a lug U²⁰ beneath which may swing a nose H¹ carried by an armature H² pivoted to the support U⁵ and normally held retracted against a vertical post H³ by a spring H⁴. The armature H² is arranged to be drawn up against the soft iron cores of two windings or coils, indicated at W¹ and W², respectively, when either or both coils are energized. The cores are carried by the support U⁵ of non-magnetic material and are joined at their outer ends by a yoke H⁵ held to the cores in any suitable way, as by screws, as shown. Each electro-magnet coil W¹, W², has its terminals led outward for connection to its respective circuit as more fully explained hereinafter.

In addition to serving as a locking device to lock the arm U¹ in its raised position, the armature H² is also arranged to open the signal key circuit when said armature is drawn up to its cores, the circuit being closed again when the armature is released and moved back. In the present embodiment of the invention, the mechanism for accomplishing this result is as follows:

A contact spring V¹ has its lower end secured to but insulated from the support U⁵, this being done in the present instance by providing the contact-spring V¹ with an enlarged hole through which is passed a screw V² threaded into the support U⁵, the screw being provided with two insulating washers V³, V⁴, one at each side of the contact spring. (See Figure 8.) The washer V³ has a projecting annulus and the hole through the spring V¹ is large enough to receive this annulus which serves as a bushing for said hole. The screw V² has a washer V⁵ and passes through the washer V⁴ through the said bushing or annulus and the washer V³ into the support U⁵. By this construction the contact spring V¹ is prevented from shifting laterally into contact with the screw. To the lower end of the contact spring V¹ is attached a conductor leading to the signal key contact, as more fully described hereinafter. The upper end of the contact spring V¹ is provided with a contact point arranged to make contact with a similar point carried by the spring U⁶. To operate the contact spring V¹, a push-pin V⁶ is provided, this sliding longitudinally through a horizontal hole in the support U⁵ and having one end arranged to be struck by an arm H⁶ carried by the armature H². The opposite end of the push-pin V⁶ is reduced in diameter and extends through a hole in the contact spring V¹, the outer or free end of the pin beyond the spring being swelled or riveted to prevent withdrawal of the pin. This pin is of insulating material. When the armature H² is attracted by its cores, the push-pin V⁶ is moved longitudinally to force the contact spring V¹ backward, thereby breaking its electrical contact with the spring U⁶. As soon as the armature H² is released, the contact spring V¹ closes into contact with spring U⁶ and also moves its push-pin V⁶ into its starting position.

While various circuit systems may be employed in connection with the electro-magnetic locking devices, I have devised a circuit system which is an important feature of the invention and very advantageous. This circuit system will be more fully described hereinafter.

It will be understood that the electro-magnetic locking system is useful with only two stations, but in such a case the two electro-magnetic coils W¹ and W² are arranged in series in one circuit and act as only one coil. Where, however, the system includes three or more stations, the two coils are arranged in two different circuits, as will be more fully explained hereinafter. As a system including four stations will include all the conditions which may arise with more than four stations and also will illustrate the working of a two or three station system, the locking circuits of a four station system have been illustrated in Figure 13 in connection with the other circuits of the system, and will be described hereinafter.

(6) *The key switches.*—These are generally of the type disclosed in the patent to Tiffany, No. 1,008,392, granted November 14, 1911.

In the specific example disclosed in that patent, each key lever actuates four pairs of contact springs, arranged in two rows placed side by side, each row having two pairs of contact springs. In the present device there may be five pairs of contact springs, two pairs in one row, and three pairs in the other row, as shown in Figure 10 of the drawing. This provides each key switch with four pairs of contact springs for the four lines (R, L, P and N) to the distant station with which said key switch is associated, and with a fifth pair of contact springs for closing the master switch circuit of its own transmitter, if this be desired, as will be more fully explained hereinafter.

As shown in Figures 9 to 12 of the drawings, a key switch comprises a key lever K¹ projecting through and fulcrumed in a cover plate Kc, this lever having its lower end provided with an insulating block or yoke K², which may be of fibre, below which is a screw with a polygonal head, indicated at K³ which serves as a latch device, as hereinafter pointed out. All the key levers of a bank of keys have the pivotal axes in line, and below all the keys is a lock-bar which may be in the form of an angle-bar having the two flanges $K^4$, $K^5$, this bar being pivoted at each end so as to have an angular movement about a longitudinal axis extending through the meeting portions of the two flanges. The pivots are indicated at $K^6$ and are mounted in suitable bearing openings or holes in hangers $K^7$ depending from the cover plate $Kc$.

The lock-bar is held yieldingly by a spring $K^8$ so that its flange $K^4$ tends to press upward against the screw heads $K^3$ of the key levers. When a key lever is swung to its "on" position the lower surface of the screw-head $K^3$ rides over the upper surface of the flange $K^4$ so that, when the key lever is vertical, the upper corner of said flange rests against the side or edge of its screw-head $K^3$, thus tending to lock the key lever in its "on" or vertical position. It can only be released when the flange $K^4$ is swung downward, either by operating another key, or by a general key-releasing device, hereinafter described.

The plurality of pairs of contact springs are mounted in sets, as hereinbefore stated. The springs of each set are sandwiched between insulating plate $K^{21}$, all being clamped between a horizontal clamping plate $K^9$ and a horizontal bar $K^{10}$ of the frame. The contact springs marked $K^{11}$ to $K^{20}$ inclusive have their lower ends projecting below the insulating material and are spread apart, as shown in Figure 10, to make it convenient to secure the respective wires to said ends.

In order that the contact springs may be operated to close circuits through the respective pairs while at the same time keeping each pair out of electrical contact with any other pair, the following construction is employed:

The front springs $K^{11}$, $K^{17}$, of each set are longer than the others and extend upward into the path of the block $K^2$ which is carried by the key lever $K^1$.

The third spring from the front in each set (viz., springs $K^{13}$, $K^{19}$,) carries a plate $Km$ of insulating material to the upper end of which is secured a block or stud $Kn$ also of insulating material. This stud is arranged to be struck by the upper end of the respective front spring of its set. When the key lever is swung from its inclined or "off" position to its vertical or "on" position, the block $K^2$ strikes the upper ends of both front springs $K^{11}$, $K^{17}$, and thereby forces the said upper ends against the studs $Kn$ of the respective third springs $K^{13}$, $K^{19}$, and forces these springs backward. Thus the springs $K^{11}$, $K^{17}$, are moved into contact with springs $K^{12}$, $K^{18}$, respectively and springs $K^{13}$, $K^{19}$, into contact with springs $K^{14}$, $K^{20}$, respectively. But on account of the insulating plates $Km$ and studs $Kn$, the springs $K^{12}$, $K^{18}$, cannot contact with the springs $K^{13}$, $K^{19}$, respectively. The pair of contact springs $K^{15}$, $K^{16}$, are similarly actuated. The spring $K^{15}$ is extended upward and carries an insulating plate $Kr$ supporting a stud $Ks$ of insulating material, which stud is struck by the upper end of the spring $K^{13}$ when the latter is bent rearward by the key lever. When the key lever $K^1$ is released by the lock-bar $K^4$, $K^5$, it is restored to its "off" position by its contact springs which are free to return to their "off" or open positions by their own resiliency.

In order to release the lock-bar and allow all the key levers to return to their "off" position, a push-rod $Ku$, Figure 9, is provided, this engaging an arm $Kv$ projecting from the arm $K^4$ of the lock-bar. By pushing down on this push-rod $Ku$, the lock-bar is rocked to release the key-levers.

(7) *The key lock.*—In order to make it impossible to operate the selector key levers when the transmitter at the same station as said keys is in its energized or transmitting condition, an automatic locking device is provided, this being operated electro-magnetically.

In the present embodiment of the invention, the following structure is employed:

An electro-magnet comprising a core $K^{22}$ and a winding $K^{23}$ is carried by the frame. To the core are secured cheeks $K^{24}$ of magnetic material. To the lower cheek is pivoted an armature $K^{25}$, pressed outward by an armature spring, such as the leaf spring $K^{26}$ secured at one end to the upper cheek $K^{24}$. The upper end of the armature is pivoted to a sliding locking bolt $K^{27}$ which plays in a slot in the upper cheek and has an end arranged to be slid beneath, or under, the bar $K^4$, thus locking it against angular movement and thereby preventing the manual operation of the key levers. The locking bolt $K^{27}$ has an upward projecting pin $K^{28}$ arranged to strike the end of an adjusting screw $K^{29}$ to limit the rearward movement of the bolt and of the armature. (See Figure 10.)

From the above description, it will be seen that when the winding $K^{23}$ is energized, the armature $K^{25}$ is attracted and the locking bolt $K^{27}$ is slid forward to lock the lock-bar $K^4$ and thereby prevent any movement of the key levers $K^1$. When the winding $K^{23}$ is not energized its armature and the locking bolt are retracted by the spring $K^{26}$, so that the lock-bar is free to swing, under the action of any key lever of its bank of key levers, thus allowing the operation of any key lever to close its respective contact springs.

In order to energize the winding $K^{23}$ of the electro-magnetic key lock, said winding is included in a branch of the circuit which includes the master-switch coil, so that when the unison switch of a transmitter is operated to energize its master-switch coil, the selector keys of that transmitter are thereupon locked so that they cannot be operated. This will be more fully explained hereinafter in connection with the description of the circuits of the whole system.

(8) *The key-operated closure mechanism for the master switch circuit.*—It is sometimes convenient to provide each key switch with a pair of contact springs arranged to close the master switch circuit, and this is the purpose of the pair of contact springs $K^{15}$, $K^{16}$, Figure 10. As each key lever of the bank of key levers is provided with such a pair of contact springs for closing the master switch circuit, these pairs are connected in multiple in the master switch circuit in a manner obvious to those skilled in the art. Where, however, other means are provided for closing the master switch circuit, the respective pairs of contact springs $K^{15}$, $K^{16}$, are useless and may be omitted entirely. In practice, however, they are usually provided with each key lever, so they can be connected up in case of a failure of operation of the said other means. Some complication in wiring is avoided by using the rocking lock-bar $K^4$, $K^5$, as a means to open and close a single pair of contact springs $K^{30}$, $K^{31}$, which are included in the master switch circuit. While this may be done in various ways, a very simple arrangement is that shown in Figures 9, 10 and 11. In this structure the arm $K^5$ of the lock-bar is provided with a rod $K^{32}$ covered with insulating material, for example, bakelite tubing, this being arranged to engage the contact spring $K^{30}$ and press it away from its companion spring $K^{31}$, thereby opening the master switch circuit. The two springs are mounted on the horizontal crossbar of the frame $K^7$, being insulated from said frame and from each other at their points of support. When the arm $K^4$ of the lock-bar is depressed by a key lever and the rod $K^{32}$ is raised, the spring $K^{30}$ closes against spring $K^{31}$. The fixed ends of said contact springs are extended laterally beyond the insulating material and to these projections may be soldered or otherwise connected the wires forming part of the master-switch circuit.

(9) *The transmitter wiring.*—Figure 13 is a diagram intended to illustrate in as simple a manner as possible the general arrangement of wiring at a transmitter, illustrating the various devices heretofore described, as well as the other old and well known parts of a transmitter, in a conventional way.

In this diagram, the contact springs of the master-switch are represented as pivoted switches having either two or three arms as the case may be, and the armature of the master-switch magnet is located in a line with these switches, with the winding of the master-switch magnet below the armature. The fact that said switches are operated by the said armature is intended to be indicated by a conventionalized showing of a rod connecting the armature of each switch, said rod being in part broken away and partly indicated by a dotted line.

The respective pairs of contact springs of each key switch, also, are shown separated and the corresponding key lever is placed in line with the contact springs which it operates, the same conventionalized connection between the key levers and its springs being indicated as with the master-switch. The key-operated contact-springs $K^{30}$, $K^{31}$ for the master-switch circuit are shown very long and extending over all keys of the bank to indicate that the one pair will be closed by any key. The lock mechanism for locking the key switches is indicated in a conventional way as a sliding bar having hooks to lock the key levers in both "off" and "on" positions, this sliding bar being provided at one end with an armature which represents the key lock armature.

Furthermore, the cut-out $V^1$ for the signal circuit is indicated as a plain switch and its mechanical connection to the armature, $H^2$, of the two transmitter lock magnets is indicated by a dotted line. That this armature also locks the unison-switch bell crank is intended to be indicated by showing a hook arm, partly dotted, connected to the said armature and having its hook arranged to engage one arm of the bell-crank when the armature is attracted.

The two rheostats of a transmitter of the variable current type are indicated at $T^2$, $T^{32}$, as two resistance coils, along which run contact rollers $T^1$, $T^{31}$, connected with the respective writing lines, it being understood that these will be moved along the rheostats by the transmitter stylus, and that the rheostats will in practice be constructed and will operate in the manner common in the art heretofore.

When the transmitter is out of operation, the master-switch spring contacts are in the condition indicated in the drawing, that is, all lines within the transmitter are open except as follows:

(a) The transmitter lock bus $Tn^b$ is closed, through $M^{31}$, $M^7$ and $M^{18}$, onto lock coil $W^1$, which is in series with a resistance $O^1$ shunted by a "busy" signal lamp $O^2$, the said resistance and lamp being connected to the negative power line at the junction $J^4$, as will be clear from the drawings.

(b) The incoming transmitter lock line $Tn^1$ which leads from all the distant stations (each of which is able to connect with it by closing the proper key at each distant station) is closed, through $M^{32}$, $M^9$ and $M^{20}$, onto transmitter lock coil $W^2$, in series with a resistance $O^3$ and connected through said resistance to the negative power line at the junction $J^4$, as shown.

When the operator at the station under consideration, and which may be referred to as station A, desires to communicate with another station, say station B, for example, he swings, to the "on" position, his key lever $K^1$ which is related to station B. If at this time station B is transmitting to another station, the incoming transmitter lock line at said station B will be connected to the positive power wire at B, as will appear from the description hereinafter of station A. Hence, when the operator at A closes the B key he will close onto a live wire and current will flow, at station A, through the transmitter lock bus $Tn^b$, over $M^{31}$, $M^7$ and $M^{18}$ to transmitter lock coil $W^1$ and thence to the negative power wire at $J^4$. This energizes coil $W^1$ which attracts its armature $H^2$ and locks the unison switch key $U^{12}$, at the same time opening the cut-out $V^1$ for the signal key $Sk$ at station A. As the busy signal lamp $O^2$ is in series with the coil $W^1$ it will be lighted and thus indicate to the operator at A that the station he attempted to communicate with is a busy station. In other words, if the operator at station A operates his key $K^1$ related to any busy station, the unison switch at A will be locked and the lamp $O^2$ will light up, because at the busy station the N wire for that station has been switched on to the positive power line at that station and is a live wire.

The final result would have been the same if station B were receiving instead of transmitting, except that the positive current would have come to station A from the station transmitting to station B, because such other transmitting station would already have been switched onto the same B line with which station A had connected.

It will be clear therefore that the operator at station A cannot operate his transmitter at all if his incoming transmitter lock line $Tn^1$ is energized from a distant station, which will always be the case if station A is receiving from a distant station, and, if not so receiving, he will lock his transmitter at once upon switching onto a line leading to a busy station, whether said station is busy receiving or transmitting. When any key switch is in its "on" position it closes the pair of contacts for the master-switch circuit of the calling station. For example, when the operator at A closes the B key to connect his transmitter lines to the lines leading to B, he also closes the contact springs $K^{30}$, $K^{31}$, which are included in the master-switch circuit of station A. This, however, does not complete the said circuit, because it is still open at the contact springs, $U^6$, $U^7$, of the unison switch.

Assuming, however, that when the operator at A has closed his B key switch, the station B is not busy, then the operator at A brings his transmitter stylus to the unison position, that is, directly over the button $U^{12}$ of his unison switch, and presses the same first downward and then laterally. This locks the switch down and closes the contact-springs $U^6$, $U^7$ which are included in the master-switch circuit. Current now flows from the junction $J^3$ of the positive power line to and through the contact springs $U^6$, $U^7$, thence to and through the key-operated contact springs $K^{30}$, $K^{31}$, and thence through the winding $Mw$ of the master-switch electro-magnet to the negative power line at $J^{17}$.

At the same time the circuit through the winding $K^{23}$ of the key lock magnet is closed by the closing of the unison switch. This circuit is as follows:

From the positive power line at $J^3$ to and through the contact springs $U^6$, $U^7$, thence to and through the winding $K^{23}$ of the key lock magnet, to the negative power line at $J^6$.

Thus the closing of the unison switch causes the key lock magnet to attract its armature $K^{25}$ and lock all the keys at station A so that they cannot be operated so long as the winding of the master-switch at station A is energized. Also the closing of the master-switch circuit causes the master-switch magnet to attract its armature $Ma$ and shift the master-switch contact springs to their transmitting position. In this condition the master switch contacts have swung to the following positions:

$M^1$ is on $M^{12}$ and $M^2$ is on $M^{13}$.
$M^3$ is on $M^{14}$ and $M^4$ is on $M^{15}$.
$M^5$ is on $M^{16}$ and $M^6$ is on $M^{17}$.
$M^7$ has left $M^{18}$, thereby opening the connection to the transmitter lock winding $W^1$.
$M^8$ is on $M^{19}$.
$M^{11}$ is on $M^{22}$.
$M^9$ has left $M^{20}$ thereby opening the connection to the transmitter lock winding $W^2$. At the same time $M^{10}$ is brought onto $M^{21}$.

The master switch in this condition closes the following circuits:

(1) The local circuit which has two branches in each of which a transmitter rheostat $T^2$, $T^{32}$, is included.
(2) The R writing line,
(3) The L writing line,
(4) The P line,
(5) The locking circuit for locking the distant station, that is to say, the circuit through the N line.

Also, the positive power line is switched onto the incoming transmitter lock line $Tn^1$ whereby it becomes a live wire, so that if, in this condition an operator at any distant station switches onto the said lock line, he will thereby lock his own transmitter, and thereby render it impossible for him to interfere with station A.

The circuits at the transmitter may be traced as follows:

The local circuit for the rheostats commences at the positive power line, at junction $J^5$, extends to contact $M^{19}$ and then to $M^{22}$, thence over contact springs $M^{11}$ and $M^{10}$ to contact $M^{21}$, thence to its junction ($J^7$) with the under platen switch $U_s$, thence to $J^9$, the junction of the positive ends of the rheostat branches, thence dividing and passing through each rheostat $T^2$, $T^{32}$, and combining again at the junction $J^8$ of the negative end of the rheostat branches, and thence to junction $J^2$ with the negative power line, $X_n$.

As the rollers $T^1$, $T^{31}$, of the L and R writing lines contact with the respective rheostats, and as these lines are connected through the distant receiver to the negative power line there, (see $J^{10}$, $J^{11}$, Figure 2), current will flow from the rheostats to said L and R lines as follows:

From L roller $T^1$ and its arm to the contact $M^{15}$, thence over $M^4$ to $M^{29}$, thence over the L writing line bus $Lw^b$ to and through the corresponding contact springs $K^{13}$, $K^{14}$, closed at the key then in the " on " position (for example the B key). Then the current passes over the L main line to the receiver, this being the $Lb$ line if the receiving station is B, the $Lc$ line if it is C, etc.

At the same time a circuit is closed to the pilot receiver as follows:

From the L roller $T^1$ to contact $M^{15}$, as before, thence over $M^4$ and $M^3$ to contact $M^{14}$ and thence over the pilot L line to the binding post $Lp$ of said pilot receiver, which line is connected to the negative power line at the junction $J^{11}$ of said pilot receiver, as shown in Figure 2.

It will be noted that the incoming L writing line for station A, indicated at $La$, is in permanent connection with the pilot L line, but no circuit can be established outward over this line from the A transmitter to a distant station, because said $La$ line is open at the keys of the distant stations and also at the master-switches of the distant stations. While the opening at the key of a distant station might be closed by the operation of a key at such distant station, the gap at the master switch of said distant station, viz, the gap in the local power circuit between the contact corresponding to $M^{21}$ and the spring corresponding to $M^{10}$, cannot be closed, because the unison switch at said distant station is locked and cannot be operated to close its master-switch.

The R writing line receives current from the R roller $T^{31}$ running in contact with the corresponding rheostat $T^{32}$, and this current can flow to contact $M^{17}$, thence over $M^6$ to $M^{30}$, thence over the R writing line bus $Rw^b$ to and through the closed contact springs $K^{17}$, $K^{18}$ of the key, then in the " on " position, and out over the proper R line to the distant receiver, for example, over the $Rb$ line to station B, if B is the receiving station.

Also a circuit is closed to the pilot receiver as follows:

From the R roller $T^{31}$ to contact $M^{17}$, thence over $M^6$ and $M^5$ to $M^{16}$ and finally out over the pilot R line to the pilot receiver post $Rp$, which, as shown in Figure 2, is connected to the negative power line at $J^{10}$. The incoming R writing line ($Ra$) is in permanent connection with said pilot R line, but no circuit can be established outward over said line to a distant station for reasons analogous to those given above concerning the $La$ line.

The P line circuit may be traced from the junction $J^5$ to contact $M^{19}$, thence to contact $M^{22}$, thence over $M^{11}$ and $M^{10}$ to $M^{21}$, thence to $J^7$ and thence over the under platen contact switch $U^5$, through a resistance $O^7$, to $M^{18}$; thence over $M^2$ to $M^{28}$; thence over the P line bus $Pl^b$ to and through the corresponding closed key contact springs $K^{11}$, $K^{12}$, and thence out over the proper P line to the distant station, for example, over line $Pb$, if B is the receiving station.

Also, a circuit is closed to the pilot receiver from the contact spring $M^2$ over contact spring $M^1$ and contact $M^{12}$ to the post $Pp$ of the pilot receiver. This is in fixed connection with the incoming P line marked $Pa$ which, however, is open at all distant stations, as was explained in connection with the $La$ line.

When writing is commenced at the transmitter, the under platen contact $U_s$ is pressed down by the stylus and the pen lifting circuit (P line) is opened. On lifting the stylus from the platen the circuit is again closed. In this way the receiver pens at the distant receiving station and also in the pilot receiver are lowered to the paper or lifted from it.

The P line also serves for signalling, from the transmitting station to the receiving station. The circuit is as follows:

From the positive power line at $J^1$ to and through the cut-out spring $V^1$ of the unison switch, to the contact of the signal key $Sk$. When the signal key is closed the current passes to $M^{28}$, thence as before over the bus $Pl^b$, through the respective key switch contacts to and over the P line to the distant receiver, where it operates the buzzer.

Because the contact spring $M^8$ is on contact $M^{19}$ the locking current to the distant station is closed at the transmitting station as follows:

From $J^5$ to contact $M^{10}$, thence over $M^8$ and $M^{31}$ to the transmitter lock bus $Tn^b$ and through the corresponding closed spring contacts, for example, $K^{19}$, $K^{20}$, out over the respective N line or locking line, for example, line $Nb$, to the respective station. At that station the locking line is the incoming transmitter lock line for said station and is connected permanently to the terminal post corresponding to $M^{32}$.

The current flows across the $M^9$ contact spring of the distant station to its contact $M^{20}$, thence through its $W^2$ winding of the locking magnets to the negative wire. The winding $W^2$ of the distant station attracts its locking armature $H^2$, thereby locking the distant transmitter.

There are connections from the positive and negative power lines to the pilot receiver, the positive pilot line leading, for example, from contact $M^{22}$ of the master-switch to post X of the pilot receiver. The negative power line from post X— of the pilot receiver is connected to any suitable point as, for example, the junction $J^2$.

The transmitter may have its positive power line $Xp$ grounded, as indicated in dotted lines at $Gt$, if local sources of electricity for each station are to be used.

From the above description it will be seen that the transmitter, when operating, works over four lines to the distant station with which it is communicating, viz, the P line, the L and R writing lines and the lock line N, these being additional to the two power lines common to all stations where such common power lines are used. Only three of these four lines (P, L and R) lead directly to the distant receiver apparatus and only three corresponding lines lead directly to the pilot receiver of the transmitting station. The fourth line, viz, the lock-line N, actuates the locking magnet of the distant transmitter at the distant station and hence does no extend to the receiver of such station, nor to the pilot receiver.

What I claim is:

1. In a telautograph having a rheostat, a rheostat roller, and a pivoted arm on which the roller is mounted, the combination, with the rheostat roller, and the said pivoted arm, of a switch device arranged to control the master-switch circuit, a lever arranged to swing in a plane transverse to the plane of movement of the said roller-carrying pivoted arm, said lever being arranged to actuate the switch device, and locking means movable with said pivoted arm and arranged to swing into and out of the path of said lever whereby the movement of said lever is prevented when the said locking means is in the path of movement of said lever, and is permitted when said means is out of said path.

2. In a telautograph having a rheostat, a rheostat roller, and a pivoted arm on which the roller is mounted, the combination, with the rheostat roller, and the said pivoted arm, of a switch device arranged to control the master-switch circuit, a lever arranged to swing in a plane transverse to the plane of movement of the said roller-carrying pivoted arm, said lever being arranged to actuate the switch device, and an angularly movable locking plate movable with said pivoted arm and arranged to be swung under or over said lever, to prevent movement of said lever and to be swung out of the path of movement of said lever to allow the latter to move, the angular width of said locking plate being less than the total angular movement of the pivoted arm.

3. In a telautograph apparatus, the combination, with an electro-magnetically operated master-switch arranged to connect the transmitter circuits, a local circuit for actuating said master-switch, and a manually operable circuit closing device for closing said local circuit, of an electro-magnetic locking device arranged to lock said circuit-closing device, a locking circuit extending to a distant station and arranged to actuate said locking device, means at the distant station for closing said locking circuit, and means for energizing the circuit.

4. In a telautograph, the combination, with a master-switch and its circuit, a switch device arranged to control the master-switch circuit, a lever arranged to actuate said switch device, and manually operable means for swinging said lever to close the master-switch circuit, of an electro-magnet, an armature therefor arranged to lock the lever when the electro-magnet is energized, and to free the lever when the electro-magnet is not energized, a circuit including the winding of said electro-magnet, means at a distant station for opening and closing said circuit, and means for energizing the circuit.

5. In a telautograph, the combination, with a master-switch arranged to establish and break the connections for putting a transmitter into and out of operation with a distant station, said master-switch having a magnet winding, a master-switch circuit including said winding, a switch device arranged to control the master-switch circuit, a lever arranged to actuate said switch-device, and manually operable means for swinging said lever to close the master-switch circuit, of a locking electro-magnet, an armature therefor arranged to lock the lever when the electro-magnet is energized and to free the lever when said electro-magnet is not energized, a set of selector switches, a bus wire for said selector switches, said bus wire being in series with said electro-magnet when the master-switch magnet is de-energized, main lines extending from the respective selector switches to the corresponding distant stations, and means at each distant station for connecting said main lines to a source of current when said distant station is busy, whereby upon closing any one of said selector switches associated with a line leading to a distant station which is busy, the said locking electro-magnet will be energized and the operation of the said master-switch will be prevented.

6. In a telautograph, the combination, with a master-switch arranged to establish and break the connections for putting a transmitter into and out of operation with a distant station, said master-switch having a magnet winding, a master-switch circuit including said winding, a switch device arranged to control the master-switch circuit, a lever arranged to actuate said switch-device, and manually operable means for swinging said lever to close the master-switch circuit, of a locking electro-magnet, an armature therefor arranged to lock the lever when the electro-magnet is energized and to free the lever when said electro-magnet is not energized, a busy signal-lamp in series with said locking electro-magnet, a set of selector switches, a bus wire for said selector switches, said bus wire being in series with said electro-magnet when the master-switch magnet is de-energized, main lines extending from the respective selector switches to the corresponding distant stations, and means at each distant station for connecting said main lines to a source of current when said distant station is busy, whereby upon closing any one of said selector switches associated with a line leading to a distant station which is busy, the said locking electro-magnet and the busy signal-lamp will be energized and the operation of the said master-switch will be prevented.

7. In a telautograph system comprising a series of complete stations each having telautograph transmitting and receiving means, each of said transmitting means comprising a unison switch, means for locking said switch to keep it out of action, a pair of locking electro-magnets for putting said locking means in its locking position, and a source of electricity having its positive connected to one terminal each of both electro-magnets, of a series of sets of telautograph transmission lines, each set extending outward from its respective station to a plurality of the other stations, a locking wire for each set, each locking wire also extending outward from its respective station to the said other stations to which its telautograph transmission lines extend, a bank of selector switches for each transmitter, each selector switch being arranged to connect its transmitter to a set of transmission lines leading to one of the other stations and simultaneously to make a connection to the corresponding locking wire of such set, the respective selector switches of a bank being associated with different stations, a locking bus conductor, at each station, for its respective bank of selector switches, switching means at each station arranged, when in one position, to connect its locking electro-magnets, one with its outward-extending locking line and the other electro-magnet with its selector switch locking bus, and when in the other position to disconnect said locking electro-magnets and connect said outward extending locking line and said selector switch locking bus to the positive of the said source of electricity, and means for completing the circuits between the respective stations.

8. In a telautograph system, the combination, with a series of complete stations, each comprising a telautograph transmitting and a telautograph receiving device, of a set of transmitting lines extending outward from each transmitting device to all the other stations of the series, a bank of selector switches at each station for switching onto any set of lines leading to a distant station, a master-switch-circuit closing means at each station arranged to be closed upon closing any selector switch of the bank at said station, a master-switch at each station arranged to connect its transmitter to the set of transmission lines selected by a selector switch, said master-switch having an electro-magnet, a unison-switch for each transmitter, a master-switch circuit, including the master-switch electro-magnet, and arranged to be closed by the unison-switch and by the said master-switch-circuit closing means, and means for energizing said circuit.

9. In a telautograph system, the combination, with a series of complete stations, each comprising a telautograph transmitting and a telautograph receiving device, of a set of transmitting lines extending outward from each transmitting device to all the other stations of the series, a bank of selector switches at each station for switching onto any set of lines leading to a distant station, an electro-magnetic locking device arranged when energized to lock all the selector switches of a bank, a master-switch circuit closing means at each station arranged to be closed upon closing any selector switch of the bank at said station, a master switch at each station arranged to connect its transmitter to the set of transmission lines selected by a selector switch, said master-switch having an electro-magnet, a unison-switch for each transmitter, a master-switch circuit including the master-switch electro-magnet and arranged to be closed by the unison-switch and by the said master-switch circuit closing means, said master-switch circuit having a shunt around the master-switch electro-magnet, in which shunt is included the electro-magnet of the locking device for the bank of selector switches, and means for energizing said circuit.

10. In a telautograph, the combination, with a transmitter having a unison-switch and a bank of selector switches for connecting said transmitter to the respective distant stations, of an electro-magnetic locking device arranged, when energized, to lock said bank of selector switches against operation, a circuit including the electro-magnet of said locking device, said circuit being closed by the unison-switch, and means for energizing said circuit.

In testimony whereof, I have hereunto set my hand.

ARLEIGH N. VAN NOSTRAND.